(12) United States Patent
Ried

(10) Patent No.: US 9,225,284 B2
(45) Date of Patent: Dec. 29, 2015

(54) CONTROLLING AN ELECTRICALLY-DRIVEN ACTUATOR

(71) Applicant: Woodward, Inc., Fort Collins, CO (US)

(72) Inventor: David L. Ried, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 22 days.

(21) Appl. No.: 13/963,853

(22) Filed: Aug. 9, 2013

(65) Prior Publication Data

US 2015/0042255 A1 Feb. 12, 2015

(51) Int. Cl.
| | |
|---|---|
| *H02P 1/00* | (2006.01) |
| *H02P 1/28* | (2006.01) |
| *H02P 3/00* | (2006.01) |
| *H02P 29/00* | (2006.01) |
| *F16K 31/00* | (2006.01) |
| *H02P 27/06* | (2006.01) |
| *H02M 7/48* | (2007.01) |
| *H02M 1/00* | (2007.01) |

(52) U.S. Cl.
CPC ............... *H02P 29/00* (2013.01); *F16K 31/00* (2013.01); *H02M 7/48* (2013.01); *H02P 27/06* (2013.01); *H02M 2001/007* (2013.01); *H02P 2201/07* (2013.01); *H02P 2201/09* (2013.01)

(58) Field of Classification Search
CPC ............. H02P 2201/09; H02M 1/4225; B60L 2210/14
USPC .......................................................... 318/504
See application file for complete search history.

(56) References Cited

U.S. PATENT DOCUMENTS

| | | | | |
|---|---|---|---|---|
| 5,325,042 | A * | 6/1994 | Murugan | 322/10 |
| 6,556,462 | B1 * | 4/2003 | Steigerwald et al. | 363/89 |
| 2008/0234897 | A1 * | 9/2008 | Tsuchida | 701/42 |
| 2008/0265808 | A1 * | 10/2008 | Sparey et al. | 318/139 |
| 2009/0108794 | A1 | 4/2009 | Ochiai et al. | |
| 2010/0127647 | A1 | 5/2010 | Huang et al. | |
| 2012/0068531 | A1 | 3/2012 | Abida et al. | |
| 2014/0268954 | A1 * | 9/2014 | Wei et al. | 363/89 |

FOREIGN PATENT DOCUMENTS

EP 1633038 3/2006

OTHER PUBLICATIONS

"Boost converter," [online], [retrieved on May 30, 2013], Retrieved from the Internet <URL: http://en.wikipedia.org/wiki/Boost_converter>, 7 pages.
PCT International Search Report and Written Opinion of the International Searching Authority, PCT/US2014/050293, May 29, 2015, 16 pages.

* cited by examiner

*Primary Examiner* — Erick Glass
(74) *Attorney, Agent, or Firm* — Fish & Richardson P.C.

(57) ABSTRACT

In some aspects, an actuation system includes an electrical positioning driver and an electrically-driven actuator. A voltage boost converter in the electrical positioning driver receives an input voltage. The voltage boost converter passes the input voltage to a voltage bus in the electrical positioning driver. The voltage on the voltage bus is converted to an actuator power signal that controls the electrically-driven actuator. The voltage boost converter boosts the voltage on the voltage bus to control a mechanical output performance of the electrically-driven actuator.

20 Claims, 2 Drawing Sheets

CONTROLLING AN ELECTRICALLY-DRIVEN ACTUATOR

BACKGROUND

This specification relates to controlling an electrically-driven actuator.

Power conversion systems such as gas and steam turbines often include actuators that control mechanical components of the system. For example, actuators can be used to control the operating states of fuel valves, air valves, variable geometry mechanisms, and other components in a power conversion system. Some actuators are electrically-driven, for example, based on electrical power provided by a voltage source in combination with an electrical motor controller.

SUMMARY

In some aspects, an actuation system includes an electrical positioning driver and an electrically-driven actuator. A voltage boost converter in the electrical positioning driver receives an input voltage. The voltage boost converter applies the input voltage or a boosted voltage to an inverter in the electrical positioning driver. The voltage on the voltage bus is converted to an actuator power signal that controls the electrically-driven actuator. The voltage boost converter boosts the voltage on the voltage bus to control performance (e.g., to improve precision, accuracy, speed, etc.) of the electrically-driven actuator.

The details of one or more implementations are set forth in the accompanying drawings and the description below. Other features, objects, and advantages will be apparent from the description and drawings, and from the claims.

DETAILED DESCRIPTION

Figure 1:
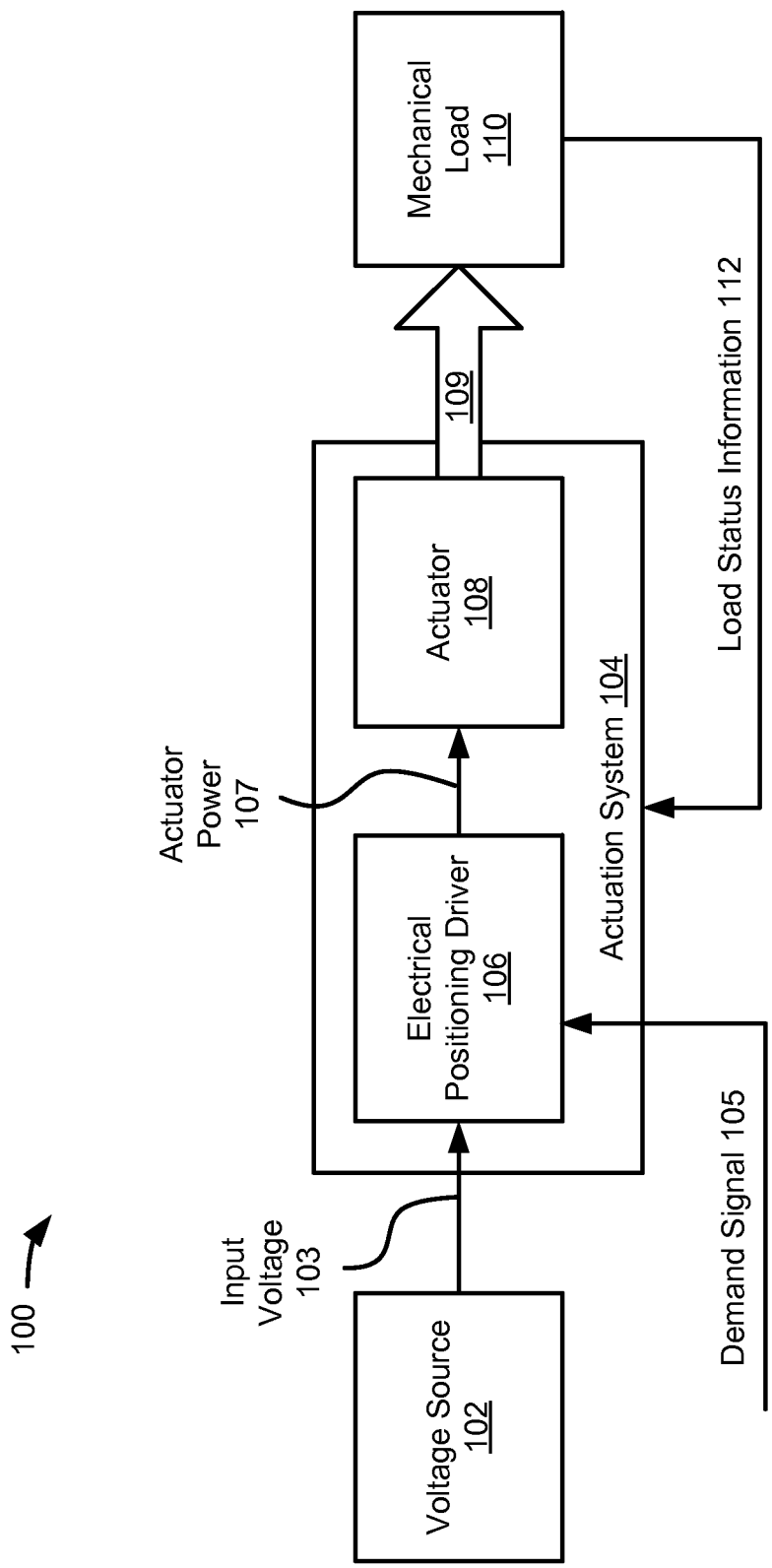
FIG. 1 is a schematic diagram of an example electro-mechanical system.

Some systems (e.g., gas and steam turbines, other types of power conversion systems, industrial systems, etc.) include actuators that are positioned during the system's operation, for example, in response to changing operating conditions or control parameters. In some cases, controlling operation of the system involves precise positioning of the actuators, for example, to control fuel, air, power, speed, variable geometry, etc. Some electric actuators are used with an associated electronic driver for controlling the position of the actuator.

In some systems, an electric actuator has a characteristic performance aspect, for example, in which the actuator spends most of its time at near-steady state position, with small modulations of its position or slow movements from one position to another; and occasionally the actuator is moved rapidly and precisely over the larger range of motion, for example, in some instances, over the full range of the available stroke. The electronic driver of the electric actuator can include an active voltage bus, where the voltage can be actively boosted to handle transient conditions, for example, on occasions where the actuator is loaded heavily, loaded rapidly, moved by a large distance, etc.

In some examples, at instances where the actuator is controlled at a near-steady state (e.g., relatively constant position, with small modulations), little mechanical work is done at the actuator, and a control current at low voltage is supplied to the actuator to counterbalance opposing loads on the actuator output. The resulting force balance can maintain a constant actuator position under a mechanical load. In such examples, at instances where the actuator is demanded to move more rapidly, mechanical work output is higher, and therefore the power delivered into the actuation system is higher. For example, the electric driver can provide a control current at high voltage to simultaneously provide torque producing-current and overcome motor back EMF in order to move the actuator to the desired position as rapidly as possible and with precision.

In some implementations, an active bus control technique uses an on-demand boost converter between an external power input (e.g., a customer-supplied power input) and an inverter stage. In some cases, during the majority of the operation time, the boost stage remains off, and the externally-supplied voltage is passed to the inverter stage with no additional processing. During high voltage demand, the boost can be turned on and the externally-supplied voltage is boosted to a desired voltage to the inverter stage.

The active bus control techniques described here can allow actuator systems to be used with a variety of externally-supplied input voltages. For example, some use environments cannot provide a high enough voltage to meet actuator performance demands. In the cases where the external voltage feed is too low, active bus control can, in some cases, produce a sufficient voltage to meet actuator performance demands. This on-demand boost can make use of the existing supply voltage, which in some cases may reduce the use of expensive and space-consuming external power supplies to achieve the desired voltage levels. For example, a high actuator performance may be required when a system trip occurs, such as when a power generation turbine experiences a sudden load drop, or the load suddenly disconnects from the turbine. In such instances, the actuator may be required to move the load (e.g., a variable geometry, fuel valve, etc.) rapidly by putting high power into the actuator.

The active bus control techniques described here can, in some instances, provide improved efficiency, improved reliability, improved lifetime, improved mechanical energy storage, or a combination of these and other benefits. For example, in some instances, operating a boost converter on-demand can reduce power losses, which may improve the thermal design context. In some cases, a smaller, less expensive electric driver can be used, and better operation in a higher temperature environment can be achieved. Reliability and product life may be improved, in some instances, by reducing voltage stress and device temperature. Operation at higher voltages may enable more mechanical energy storage in an actuator system (e.g., in the rotor of a motor actuator).

FIG. 1 is a schematic diagram of an example electro-mechanical system 100. In some cases, the example electro-mechanical system 100 can be implemented in the context of a power conversion system or another type of environment. For instance, the electro-mechanical system 100 can be a subsystem of a power conversion system (e.g., a gas or steam turbine system). In some examples, the electro-mechanical system 100 can include a valve (e.g., a fuel valve, an air valve, etc.) in a turbine system, a variable geometry (e.g., a variable flow path, a variable chamber, etc.) in a turbine system, or the electro-mechanical system 100 can control another system component (e.g., a turbine, a compressor, a pump, propulsion, generator drive, etc.).

The example electro-mechanical system 100 shown in FIG. 1 includes a voltage source 102, an actuation system 104, and a mechanical load 110. As shown in FIG. 1, the actuation system 104 can receive a demand signal 105 that specifies a position for the actuator 108, the voltage source 102 can provide an input voltage 103 to the actuation system 104, and the actuation system 104 can provide a mechanical output (which may, in some instances, counter the mechanical load 110), for example, by operation of the actuator 108. The actuation system 104 can also receive load status information 112 related to the mechanical load 110. An electro-mechanical system 100 can include additional or different features, and the features can be arranged or configured to interact as shown in FIG. 1 or in another manner.

The example voltage source 102 can be a power supply, a power grid, or another source of electrical power. The voltage source 102 can provide a fixed voltage amplitude that is substantially constant over time, or the voltage source 102 can provide a time-varying voltage amplitude that changes over time. In some cases, the voltage source 102 has a maximum output voltage (e.g., 300 Volts, 400 Volts, etc.).

As shown in FIG. 1, the voltage source 102 produces an input voltage 103, which is provided to the actuation system 104. The input voltage 103 can be, for example, an alternating current (AC) signal, a direct current (DC) signal, or another type of signal. In the example shown, the input voltage 103 has an amplitude that is less than or equal to the maximum voltage of the voltage source 102.

The example actuation system 104 shown in FIG. 1 includes an electrical positioning driver 106 and an actuator 108. In the example shown, the actuator 108 is an electrically-driven actuator, and the electrical positioning driver 106 controls the position of the actuator 108. In some cases, the electrical positioning driver 106 can control the position of the actuator 108 in response to the demand signal 105. The demand signal 105 can be a demand or setpoint signal that indicates a desired position of the actuator 108. The demand signal 105 can be generated, for example, by a controller or other hardware in the electro-mechanical system 100, or the demand signal 105 can be generated external to the electro-mechanical system 100. In some cases, electrical positioning driver 106 moves or maintains the position of the actuator 108 according to the demand signal 105.

The electrical positioning driver 106 can receive the input voltage 103 and the demand signal 105 and generate the actuator power 107 that controls the actuator 108. The actuator 108 can receive the actuator power 107 and produce a mechanical output 109 based on the actuator power 107. In some cases, the performance of the mechanical output 109 is determined by the electrical power content of the actuator power 107. For example, increasing or decreasing the actuator power 107 can produce a corresponding increase or decrease in the performance of the mechanical output 109. The actuation system 104 can include additional or different features, and the features of the actuation system 104 can operate or interact as shown in FIG. 1 or in another manner.

The example electrical positioning driver 106 can include an active voltage bus, which can be used to boost the voltage of the actuator power 107, for example, based on the load status information 112 from the mechanical load 110 or a command signal from another device. In some cases, the electrical positioning driver 106 includes a voltage boost stage, and the voltage boost can be activated to increase the voltage on the electrical driver's output terminal, which can increase the voltage on the active voltage bus. The voltage boost stage can be activated by the load status information 112 (e.g., by the type of load status information 112, a change in the load status information 112, the presence or absence of load status information 112, etc.) or based on other types of information. The voltage on the active voltage bus can be processed (e.g., inverted, filtered, etc.) to produce the actuator power 107.

The example electrical positioning driver 106 can include a filtering stage, a voltage boost stage, an inverter stage, and other types of electrical stages. For example, the electrical positioning driver 106 can be the example electrical driver 200 shown in FIG. 2 or another type of electrical driver. The electrical positioning driver 106 can include various digital circuits, analog circuits, microprocessors, software, or combinations of them. In some cases, the electrical positioning driver 106 can control the actuator power 107 to provide precise, accurate positioning of the actuator 108. For example, the electrical positioning driver 106 may control the position of the actuator by controlling the actuator power 107.

The actuator power 107 can be, for example, an alternating current (AC) voltage signal, a direct current (DC) voltage signal, or another type of voltage signal. The actuator power can have a period or phase that is configured or matched to operate the actuator 108. In the example shown, the electrical positioning driver 106 can operate in a boost mode that actively boosts the voltage of the actuator power 107, or the electrical positioning driver 106 can operate in a passive mode that does not actively boost the voltage of the actuator power. In the boost mode, the actuator power 107 can have a voltage amplitude that is higher than the voltage amplitude of the input voltage 103. For example, in some instances, the actuator power 107 has an amplitude that is greater than the maximum voltage of the voltage source 102.

The example actuator 108 can be, for example, an electric actuator, an electro-hydraulic actuator, an electro-hydrostatic actuator, or another type of electrically-driven actuator. In some examples, the actuator 108 can be a motor, a solenoid, or another type of system that includes a mover that can move (e.g., rotate, translate, etc.) or maintain its position in response to the electrical actuator power 107. The mover can be configured to produce a mechanical output 109 (e.g., force, pressure, torque, etc.) that is in proportion to, or otherwise related to, the actuator power 107. The actuator 108 can include circuits, gears, bearings or other hardware configured to control the mechanical output 109. The mechanical output 109 can be, for example, a force, movement, pressure, torque, or other mechanical action on the mechanical load 110. The mechanical output 109 can be provided, for example, by a linear, rotational, or other type of action by a component of the actuator 108.

The mover of the actuator 108 can be, for example, a rotor of an electric motor. For instance, the actuator 108 can include an electric motor that includes a stator and a rotor that are coupled by magnetic inductance. The stator can include conductive windings that receive the actuator power 107 and produce a time-varying magnetic field that moves the rotor, for example, by a magnetic interaction between the rotor and the stator. Accordingly, the electric motor can convert the actuator power 107 to mechanical movement of the rotor. In some cases, the rotor is mechanically coupled to a shaft that rotates with the rotor, and the shaft can provide the mechanical output 109 on the mechanical load 110.

In some implementations, the actuator 108 has a discrete number (e.g., two, three, four, etc.) of available actuator positions, or the actuator 108 can have a continuous range of available actuator positions, and the actuator power 107 can be applied to the actuator 108 to specify (e.g., change, maintain, increment, decrement, etc.) the actual position of the actuator 108. As an example, the actuator 108 can be a valve that has an "open" state (that permits flow) and "closed" state (that prohibits flow), and the actuator power 107 can specify whether the valve is in the "open" or "closed" state. As another example, the actuator 108 can be a valve that has a "closed" state (that prohibits flow) and a range of "open" states (that allow varying degrees of flow), and the actuator power 107 can specify the degree to which the valve is open or closed. As another example, the actuator 108 can power a variable geometry mechanism as a load that has a range of positions, and the actuator power 107 can specify the actual position of the variable geometry mechanism. In some cases, the actuator power 107 specifies the actual position of the actuator 108 according to a demand or setpoint signal received by the electrical positioning driver 106 (e.g., the demand signal 105 or other information).

In some implementations, the electrical positioning driver 106 can be configured to produce an actuator power 107 that maintains the actuator in a specified position, or to produce an actuator power 107 that moves the actuator to a specified position. In some cases, the specified position can be determined by the electrical positioning driver 106, for example, based on control signals, a positioning algorithm, etc. In some cases, the specified position can be determined external to the electrical positioning driver 106, for example, by an external controller that provides input (e.g., the demand signal 105) to the driver 106. The specified position can be determined based on the load status information 112, or independent of the load status information 112.

In some implementations, the electrical positioning driver 106 includes a voltage boost converter that controls performance of the actuator 108. For example, the voltage boost converter can improve the actuator's performance by providing more electrical power to the actuator on demand or at specified times. In some cases, the performance of the actuator 108 includes the actuator's positioning accuracy, and improving the actuator's performance can include preventing, damping, or otherwise reducing variations or disturbances of the actuator's position. In some cases, the performance of the actuator 108 includes actuator re-positioning precision, and improving the actuator's performance can include increasing the actuator's speed in transiting between actuator positions or states. Controlling the performance of the actuator 108 can include controlling these and other aspects of the actuator's accuracy, precision, or other performance metrics.

The example mechanical load 110 can be any mechanical load (e.g., force, pressure, torque, friction, etc.) applied to the actuator 108. For example, in implementations where the actuator 108 includes a valve that moves (e.g., opens or closes a flow path) to control a flow of fluid through the valve, the mechanical load can include the pressure of the fluid on the valve. As another example, in implementations where the actuator 108 includes a variable geometry mechanism that moves (e.g., expands or restricts a fluid chamber) to control a fluid volume, the mechanical load can include the pressure of the fluid on the variable geometry mechanism.

The example load status information 112 can include any information or data relating to the mechanical load 110, the mechanical output 109, an external system associated with the mechanical load 110, the actuator position, or a combination of them. The load status information 112 can be an electric signal that either activates or de-activates a voltage boost in the electrical driver. In some implementations, the load status information 112 is generated by a digital electronic controller, a microprocessor, or another type of computing device based on an algorithm that predicts or detects an increase in the mechanical load 110. The load status information 112 can be encoded, for example, in a binary signal, a voltage-modulated signal, a current-modulated signal, a frequency-modulated signal, a data packet or data stream, or other types of information.

In some example implementations, the actuation system 104 shown in FIG. 1 is a subsystem of a broader system environment, for example, where the actuation system 104 includes a valve or a variable geometry mechanism of a turbine system, or in other cases. The voltage source 102 can be a shared voltage source of the system environment, and the input voltage 103 can be generated within or external to the system environment. The input voltage 103 can be a customer-supplied, user-supplied, or another type of externally-supplied voltage feed that is provided as an input to the system environment.

In some cases, the input voltage 103 from an external supply does not provide sufficient power to maintain performance of the actuator 108 under certain operating conditions, for example, during transient events. For example, some customer-supplied voltages may be sufficient to control the position of the actuator 108 during steady-state operation of the system environment; but when the system environment creates a transient loading condition (e.g., rapidly increasing or decreasing the mechanical load 110), the customer-supplied voltage may not control the position of the actuator 108 with sufficient speed or precision. In such instances, the voltage boost of the electrical positioning driver 106 can increase the voltage on the variable voltage bus of the electrical positioning driver 106, to increase the performance (e.g., accuracy, speed, precision) of the actuator 108. For example, the load status information 112 can activate the voltage boost in response to the mechanical load 110 or in response to other conditions of the system environment.

In some examples, the actuator 108 is a motor, and the external supply (e.g., customer- or user-supplied voltage feed) can be a single-phase or three-phase AC or DC voltage. The external voltage may vary too much or be insufficiently low to overcome motor back EMF generated by the actuator motor during rapid actuator movements. Since power losses increase as voltage increases, a lower bus voltage on the electrical positioning driver 106 can be more efficient, for example, by reducing unnecessary power loss associated with a fixed bus voltage. Active bus control of the electrical positioning driver 106 can be provided by an internal on-demand voltage converter to increase the voltage available to the inverter of the electrical driver.

In some instances, the example electrical positioning driver 106 can provide advantages, for example, by using an active bus control, a voltage boost, or other features. In some cases, electrical positioning driver 106 can provide high performance actuator positioning when available voltage feeds are too low or have too much variation. In some cases, electrical positioning driver 106 can reduce power loss by keeping the inverter voltage lower during near-fixed actuator position operation. In some cases, electrical positioning driver 106 can allow improved (e.g., optimized) actuator sizing by opening the range of motor and gear ratios available to the actuator design. In some cases, electrical positioning driver 106 can improve reliability and product life by reducing voltage stress and device temperature.

Figure 2:
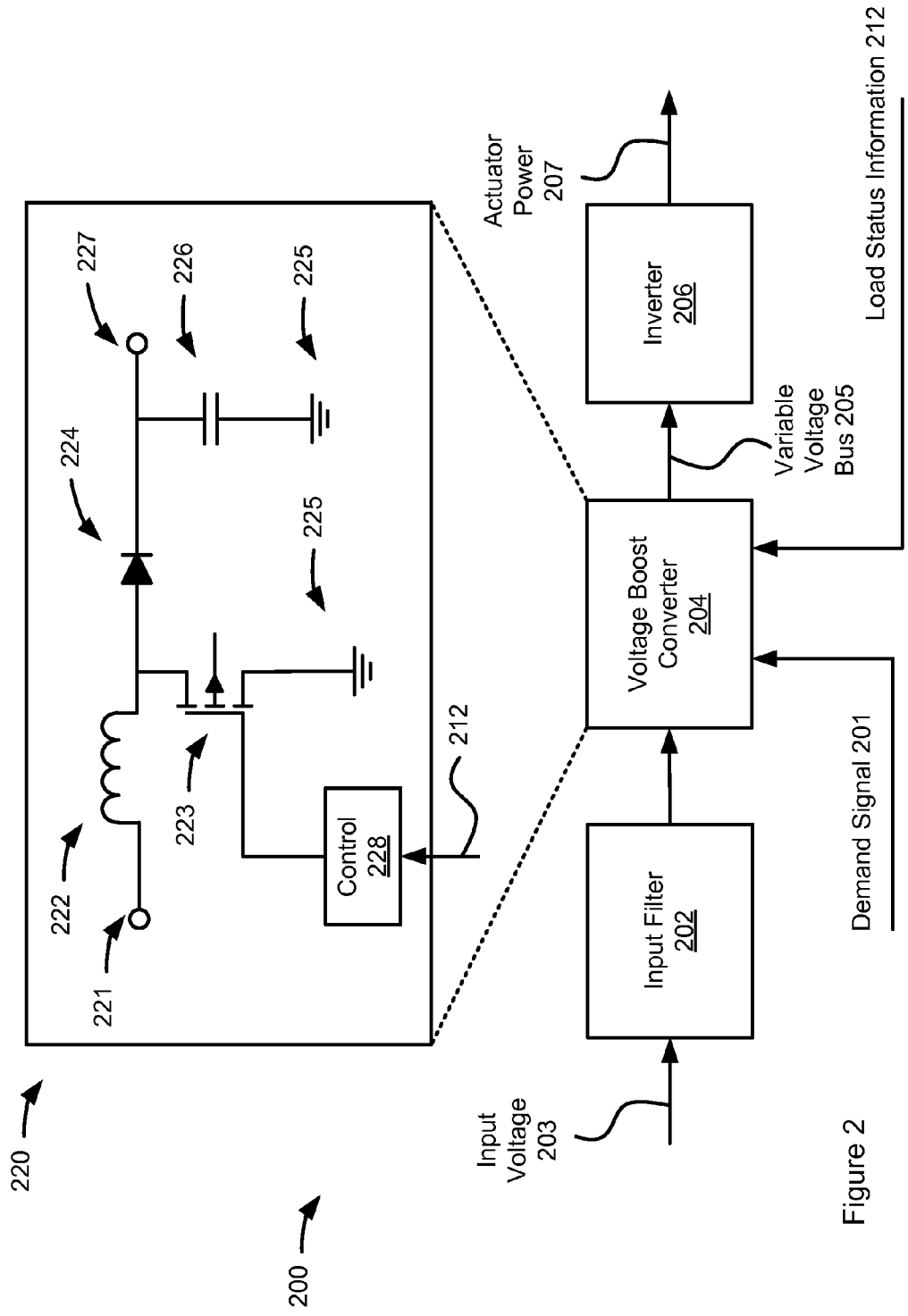
FIG. 2 is a schematic diagram of an example electrical driver for an actuation system.

FIG. 2 is a schematic diagram of an example electrical driver 200 for an actuation system. The example electrical driver 200 can be used to implement all or part of the electrical positioning driver 106 shown in FIG. 1. The electrical driver 200 can be used in other environments or in another manner. In the example shown in FIG. 2, the electrical driver 200 receives an input voltage 203 and load status information 212, and generates actuator power 207, which can be delivered to an actuator. The electrical driver 200 shown in FIG. 2 includes an input filter 202, a voltage boost converter 204, and an inverter 206. The electrical driver 200 can include additional or different features, and the electrical driver can be configured to operate as shown in FIG. 2 or in another manner.

In the example shown in FIG. 2, the voltage boost converter 204 receives a filtered input voltage (from the input filter 202), a demand signal 201, and load status information 212, and the voltage boost converter 204 provides a variable voltage signal on the variable voltage bus 205. The inverter 206 receives the variable voltage signal on the variable voltage bus 205 and produces the actuator power 207 as output. The components of the electrical driver 200 can be arranged or configured to interact in the manner shown in FIG. 2 or in another manner. Components of the electrical driver 200 can include or be implemented by electronic circuits that include digital or analog electronic components, digital electronic controllers, digital microprocessors or other types of hardware, software, or firmware.

The example input filter 202 can receive the input voltage 203, and apply one or more filters to the received input voltage 203 to produce a filtered input voltage signal. The input filter 202 can include one or more high-pass filters, low-pass filters, band-pass filters, band-stop filters, half-wave ac rectifiers, full-wave ac rectifiers, or a combination of these and other types of components. In some implementations, the input filter 202 protects the other components of the electrical driver 200 from a power surge. For example, the input filter 202 may be configured to shield the internal electronics of the electrical driver 200 in the event that the input voltage 203 increases above a threshold voltage.

The example voltage boost converter 204 can receive the filtered input voltage from the input filter 202 and apply an output voltage to the variable voltage bus 205. The voltage boost converter 204 can be configured to vary the output voltage based on various control signals (e.g., the demand signal 201, etc.), the load status information 212, or other information. For example, in some instances the voltage boost converter 204 increases the voltage between input filter 202 and the inverter 206, and in some instances the voltage boost converter 204 passes the voltage signal from the input filter 202 to the inverter 206 without modifying (e.g., without increasing or decreasing) the voltage signal. The voltage boost converter 204 can provide active bus control of the electrical driver 200 to increase the voltage available to the inverter 206, for example, in response to load demands during operation.

FIG. 2 also shows an example voltage boost circuit 220, which can be used to implement the voltage boost converter 204. The voltage boost converter 204 can be implemented using other types of circuits or different boost topologies. The example voltage boost circuit 220 shown in FIG. 2 includes an input node 221, an inductor 222, a transistor 223, a diode 224, a reference voltage 225, a capacitor 226, an output node 227, and a control 228. The example voltage boost circuit 220 can be implemented with additional or different circuit components, and the circuit components can be configured as shown in FIG. 2 or in another manner.

The example shown in FIG. 2 includes a boost converter topology; in some cases, a buck-boost converter topology, a single-ended primary-inductor converter (SEPIC) topology, or another type of topology can be used to boost voltage. The example boost converter topology shown in FIG. 2 can run in a passive mode, where no power is consumed by the voltage boost converter in some instances (e.g., in the non-boost mode) of operation. Some topologies (e.g., buck-boost, SEPIC) do not have a passive mode of operation and may consume more energy in some instances.

In the example shown in FIG. 2, the input node 221 receives the filtered input voltage from the input filter 202, and the output node 227 provides the variable voltage signal to the variable voltage bus 205. Based on the load status information 212, the voltage boost circuit 220 can actively increase the voltage between the input node 221 and the output node 227, or the voltage boost circuit 220 can pass the voltage from the input node 221 to the output node 227 unmodified (i.e., without actively increasing or decreasing the voltage).

The control 228 can determine whether the example voltage boost circuit 220 applies a voltage boost to the voltage signal between the input node 221 and the output node 227 based on the load status information 212. In some cases, the load status information 212 can be a binary control signal or another type of signal that either activates or de-activates the voltage boost converter 204. For example, the load status information 212 can provide a high voltage signal to activate the voltage boost converter 204, and the load status information 212 can provide a low voltage signal to de-activate the voltage boost converter 204.

In the example shown in FIG. 2, the control 228 receives the load status information 212 and controls the state of the transistor 223 according to the load status information 212. For example, the control 228 can control (e.g., change, maintain, etc.) the state of the transistor 223 based on the load status information 212. In the example shown, the state of the transistor 223 can determine whether the voltage boost circuit 220 applies a boost to the voltage between the input node 221 and the output node 227.

The example inverter 206 can receive the variable voltage signal on the variable voltage bus 205, and invert the variable voltage signal to produce the actuator power 207. In the example shown in FIG. 2, the inverter 206 converts a direct current (DC) voltage signal to an alternating current (AC) signal. For example, the variable voltage signal from the voltage boost converter 204 can be a DC signal, and the actuator power 207 produced by the inverter 206 can be an AC signal. The inverter 206 can be a static inverter that includes one or more switching circuits. In some cases, the inverter 206 can be a three-phase inverter or another type of conventional inverter.

In the example shown in FIG. 2, the actuator power 207 produced by the inverter 206 can be a square wave (e.g., 2-level, 3-level, 4-level, 5-level, etc.) or a series of square waves or sine waves, or another type of time-varying signal. The actuator power 207 can have a voltage amplitude (e.g., peak-to-peak voltage, root-mean-square voltage, maximum voltage, etc.) that is based on the voltage output of the voltage boost converter 204. The actuator power 207 can have a period and phase that are controlled by the inverter 206. The period and phase of the actuator power 207 can be configured to operate an actuator that receives the actuator power 207.

In some aspects of operation, the electrical driver 200 operates with the voltage boost converter 204 in a non-boost mode of operation. In the non-boost mode of operation, the actuator power 207 can have a voltage amplitude that corresponds to the voltage amplitude of the input voltage 203. For example, the electrical driver 200 can generate the actuator power 207 based on the input voltage 203 without actively increasing or decreasing the voltage amplitude. In some instances, during operation, the load status information 212 can modify the state of the electrical driver 200, for example, switching the voltage boost converter 204 between the non-boost mode and the boost mode. In the boost mode of operation, the actuator power 207 has a higher voltage amplitude than the input voltage 203. For example, the input voltage 203 can be actively increased from a low voltage input (e.g., 200 Volts, 300 Volts, etc.) to a high voltage output (e.g., 400 Volts, 500 Volts, etc.).

In some instances, the voltage boost converter 204 can be switched from the boost mode to the non-boost mode, or from the non-boost mode to the boost mode during operation of the electrical driver 200. For example, the load status information 212 can be generated to activate or de-activate the boost mode of the voltage boost converter 204 on demand, in real time, based on loading or an anticipated loading on an actuator. In some cases, the electrical driver 200 primarily operates in the non-boost mode, and the boost mode is only used during transient periods when the load on the actuator is changing relatively quickly.

A number of examples have been shown and described; various modifications can be made. While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable sub-combination. Accordingly, other implementations are within the scope of the following claims.

The invention claimed is:

1. A method of controlling an electrically-driven actuator, the method comprising:
    receiving an input voltage at a voltage boost converter of an electrical positioning driver in an actuation system;
    applying the input voltage to a voltage bus of the electrical positioning driver;
    converting a voltage on the voltage bus to an actuator power signal that controls a position of the electrically-driven actuator;
    receiving a load status at the voltage boost converter, the load status comprising load status information relating to the position of the electrically-driven actuator; and
    boosting the voltage on the voltage bus, by selective operation of the voltage boost converter based on the load status, to control performance of the electrically-driven actuator.

2. The method of claim 1, wherein the actuation system comprises a subsystem of a power conversion system, and receiving the input voltage includes receiving the input voltage from a voltage source that is external to the power conversion system.

3. The method of claim 2, wherein boosting the voltage on the voltage bus increases an amplitude of the voltage on the voltage bus above a maximum output voltage amplitude of the voltage source.

4. The method of claim 1, wherein boosting the voltage on the voltage bus increases an amplitude of the voltage on the voltage bus above an amplitude of the input voltage.

5. The method of claim 1, comprising:
    passing the input voltage from the voltage boost converter to the voltage bus during a first time period; and
    boosting the voltage on the voltage bus during a second, different time period.

6. The method of claim 5, comprising:
    passing the input voltage from the voltage boost converter to the voltage bus during a steady-state operating condition of the electrically-driven actuator; and
    boosting the voltage on the voltage bus during a transient-state operating condition of the electrically-driven actuator.

7. The method of claim 1, wherein converting the voltage on the voltage bus to an actuator power signal includes operating an inverter of the electrical positioning driver, and operating the inverter generates a time-alternating voltage signal based on the voltage on the voltage bus.

8. The method of claim 1, comprising boosting the voltage on the voltage bus in response to information from a load on the electrically-driven actuator.

9. The method of claim 1, comprising filtering the input voltage signal and passing a filtered input voltage signal from the voltage boost converter to the voltage bus.

10. An actuation system comprising:
    an actuator having an actuator position that is controlled by an actuator power signal from an output terminal of an electrical positioning driver; and
    the electrical positioning driver, including:
        a voltage bus electrically connected between a voltage boost converter of the electrical positioning driver and the output terminal; and
        the voltage boost converter that is controlled by a load status signal comprising load status information relating to the position of the electrical positioning driver and electrically connected between the voltage bus and an input terminal of the electrical positioning driver, the voltage boost converter operable to apply a voltage to the voltage bus, and to selectively boost the voltage on the voltage bus based on the load status signal to control performance of the actuator.

11. The actuation system of claim 10, the electrical positioning driver further including an input filter electrically connected between the input terminal and the voltage boost converter, wherein the voltage boost converter is operable to:
    receive a filtered input voltage from the input filter;
    pass the filtered input voltage to the voltage bus; and
    boost the filtered input voltage to control the performance of the actuator.

12. The actuation system of claim 10, wherein the actuator includes a rotor that moves or maintains its position in response to the actuator power signal.

13. The actuation system of claim 10, wherein the actuation system comprises a subsystem of a power conversion system, and the input terminal of the electrical positioning driver is electrically connected to receive an input voltage from a voltage source that is external to the power conversion system.

14. The actuation system of claim 13, wherein the actuator comprises a valve of the power conversion system, and controlling the performance of the actuator includes controlling movement of a valve component.

15. The actuation system of claim 13, wherein the actuator comprises a variable geometry mechanism of the power conversion system, and controlling the performance of the actuator includes controlling movement of the variable geometry mechanism.

16. The actuation system of claim 10, the electrical positioning driver further including an inverter electrically connected between the voltage bus and the output terminal.

17. The actuation system of claim 10, wherein the voltage boost converter includes a control module configured to receive the load status signal, wherein the control module is operable to switch the voltage boost converter between operating in a boost mode and a non-boost mode based on the load status signal.

18. The actuation system of claim 17, wherein the control module is configured to switch the voltage boost converter based on load status information provided by the load status signal.

19. The actuation system of claim 10, wherein the load status signal is based on a prediction of or a detection of a change in a load on the electrically-driven actuator.

20. The method of claim 1, wherein the load status is based on a prediction of or a detection of a change in a load on the electrically-driven actuator.

* * * * *